(12) United States Patent
Jiang

(10) Patent No.: US 7,493,110 B2
(45) Date of Patent: Feb. 17, 2009

(54) MISSED CALL ALERTS

(75) Inventor: Yue Jun Jiang, Danville, CA (US)

(73) Assignee: Roamware Inc., San Jose, CA (US)

( * ) Notice: Subject to any disclaimer, the term of this patent is extended or adjusted under 35 U.S.C. 154(b) by 362 days.

(21) Appl. No.: 11/288,421

(22) Filed: Nov. 29, 2005

(65) Prior Publication Data

US 2006/0133590 A1    Jun. 22, 2006

Related U.S. Application Data

(60) Provisional application No. 60/631,337, filed on Nov. 29, 2004.

(51) Int. Cl.
*H04M 3/42* (2006.01)
(52) U.S. Cl. ........... 455/418; 455/414.1; 370/356
(58) Field of Classification Search ........... 455/414.1, 455/418, 419, 445; 379/201.01, 211.01; 370/356
See application file for complete search history.

(56) References Cited

U.S. PATENT DOCUMENTS

2005/0041793 A1* 2/2005 Fulton et al. ........... 379/211.01
2006/0178135 A1* 8/2006 Jiang et al. ............... 455/414.1

* cited by examiner

*Primary Examiner*—Sam Bhattacharya
(74) *Attorney, Agent, or Firm*—Arent Fox LLP (57) ABSTRACT

The present invention discloses a method of providing a Missed Call Alert (MCA) for a missed call to a first device in a first telecommunications network, wherein the MCA is provided to a second device in a second telecommunications network. The method comprises forwarding a call missed by the first device to a forwarding address in the second telecommunications network, and obtaining missed call details from the forwarded call at the second telecommunications network. The missed call details comprise the calling party address and the address of the first device. The method further comprises identifying the address of the second device, wherein the second device is associated with the first device, and alerting the second device of the missed call to the first device.

28 Claims, 5 Drawing Sheets

MISSED CALL ALERTS

RELATED APPLICATION

This application claims priority from U.S. Provisional Patent Application Ser. No. 60/631,337, filed Nov. 29, 2004, entitled Fixed-line Missed Call Alert. The entirety of that provisional application is incorporated herein by reference.

FIELD OF THE INVENTION

The present invention relates to providing a Missed Call Alert (MCA). More specifically, the present invention relates to providing an MCA for a call missed by a device in one telecommunication network to a device in a different telecommunication network.

BACKGROUND OF THE INVENTION

Many solutions to provide Missed Call Alerts (MCAs) to wireless phones are known in the art. These solutions share a common approach. Namely, when a network element determines that a call terminating at a mobile phone is "missed", the caller identification (caller ID) of the caller is sent to a Short Message Service Center (SMSC). The SMSC delivers an MCA as an SMS alert to that mobile subscriber's handset. "Missed" means that either the mobile subscriber handset is off or the mobile subscriber handset is busy, not answering or out of coverage. There may be further qualifications to a "missed" call, for example—a call attempt may qualify as "missed" only if the caller has not left a voicemail to the called mobile subscriber.

If the caller is also a mobile subscriber, there are also solutions that alert the caller via SMS if the original called party is available (in coverage, not busy, or powered on) again. The mobile caller can be restricted to the same mobile network or may be calling from any other mobile or fixed-line network depending on whether they support SMS interworking with the called network.

In other known solutions, call forwarding is normally available for missed calls from a fixed-line phone to a mobile phone. In prior art call forwarding from fixed-line phones to mobile phones, missed calls at the fixed-line phone are forwarded to a mobile phone. In such cases, the mobile phone user gets an incoming call if the fixed-line phone misses a call. This may not always be desirable to the user. The user may desire to receive only a notification or alert that a call has been missed at the fixed-line, without receiving the call on the mobile phone. Further, if the mobile phone misses the call too, the missed call alert received by the mobile phone is no different from the missed call alert it would receive if it were to miss a call that was originally routed for the mobile phone.

Despite these solutions for wireless mobile subscribers, there is no solution present today for fixed-line missed call alerts. That is, none of the state of the art solutions alerts a mobile subscriber when he misses a call to his fixed-line phone. There is a need in the art for a method to alert a mobile subscriber (or another subscriber whose telecommunications equipment is capable of displaying or conveying an alert message) when he has missed a call to his fixed phone line, or a telecommunications address other than his mobile handset.

Further, the missed call alerting solutions known in the art provide an alert only to the device that misses the call. However, when a user misses a call on a device, it is likely that the user will be unable to receive an alert of the missed call on the same device soon thereafter. Thus, there is a time lag between the time when a call is missed, and when the user gets alerted of the same. On the other hand, it is sometimes likely that a user who has missed a call on one device may be immediately available on another device.

Thus, there is a need for a solution that provides alerts to the user of a device about a call missed on that device in one network by using an alert sent through another device in another or same network.

SUMMARY OF THE INVENTION

The present invention discloses a simple and cost-effective solution for providing a user with an alert via his present phone handset, or any telecommunications address, when he has missed a call to a non-present phone handset, or any other telecommunications address.

In an embodiment, the present invention discloses a method of providing a Missed Call Alert (MCA) for a missed call to a first device in a first telecommunications network, wherein the MCA is provided to a second device in a second telecommunications network. The method comprises forwarding a call missed by the first device to a forwarding address in the second telecommunications network, and obtaining missed call details from the forwarded call at the second telecommunications network. The missed call details comprise the calling party address and the address of the first device. The method further comprises identifying the address of the second device, wherein the second device is associated with the first device, and alerting the second device of the missed call to the first device.

In another embodiment, the present invention discloses a method of providing a Missed Call Alert (MCA) for a missed call to a fixed-line phone, wherein the MCA is provided to a mobile phone. The method comprises forwarding a call missed by the fixed-line phone to a forwarding address in the mobile network, and obtaining missed call details from the forwarded call at the mobile network. The missed call details comprise the calling party address and the address of the fixed-line phone. The method further comprises identifying the address of the mobile phone, wherein the mobile phone is related to the fixed-line phone, and alerting the mobile phone of the missed call to the fixed-line phone.

BRIEF DESCRIPTION OF DRAWINGS

In the drawings, the same or similar reference numbers identify similar elements or acts.

DETAILED DESCRIPTION

The present invention discloses a method of providing a Missed Call Alert (hereinafter MCA) for a call missed by a first device in a first telecommunications network, wherein the MCA is provided to a second device in a second telecommunications network. Various embodiments of the present invention teach a method of sending a missed call alert to a mobile phone line or first device, when a call is missed at a fixed-line phone or second device.

Figure 1:
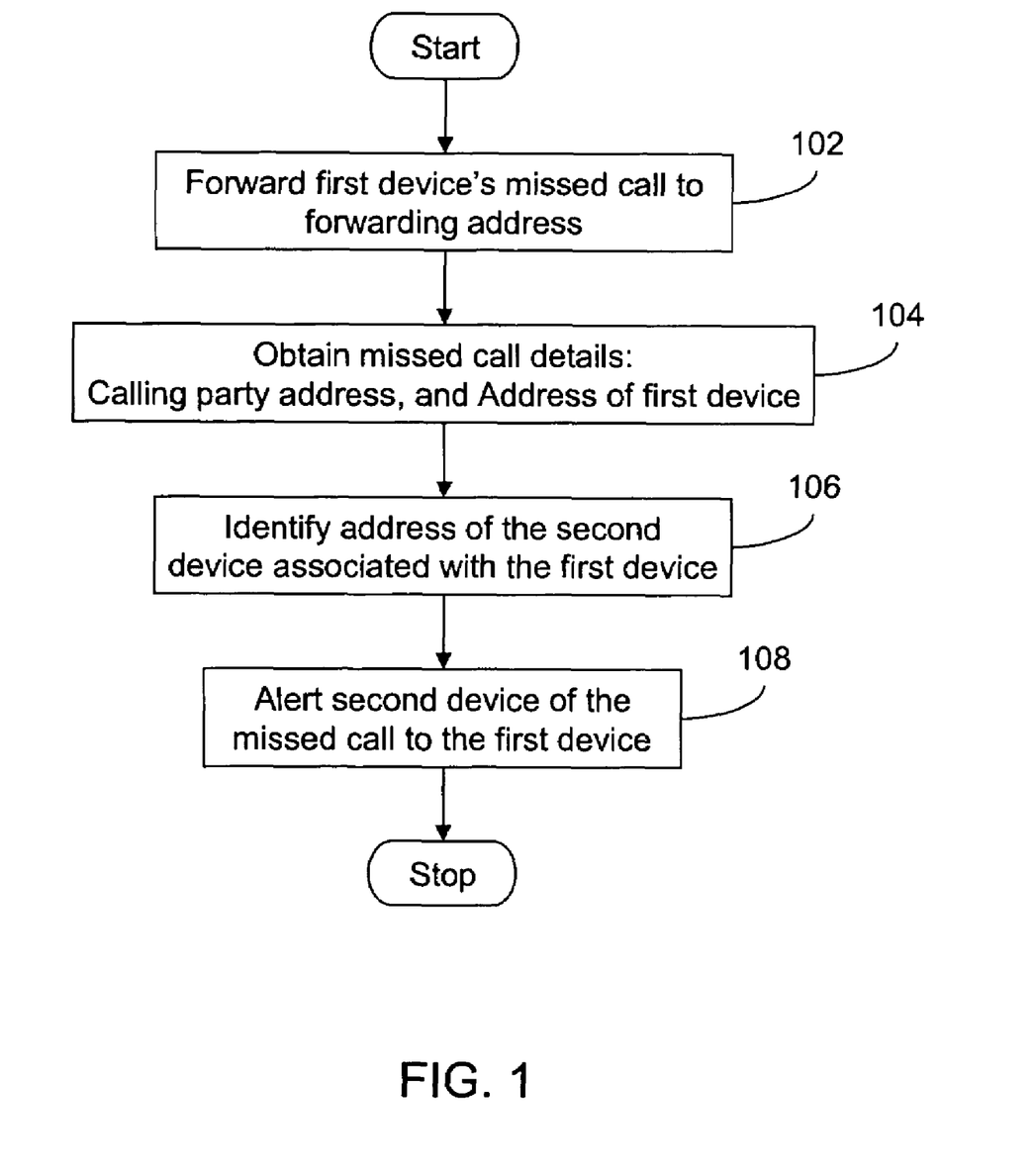
FIG. 1 shows a flowchart depicting the method of providing a MCA in accordance with an embodiment of the present invention.

FIG. 1 shows a flowchart depicting the method of providing a MCA in accordance with an embodiment of the present invention. The disclosed method provides an MCA for a call missed by a first device in a first telecommunications network to a second device in a second telecommunications network. At step 102, a missed call from the first device is forwarded to a forwarding address. The forwarding address is an address in the second telecommunications network. The second communications network is configured to receive forwarded missed calls on the forwarding address. In an embodiment, the forwarding may be performed by a network element in the first communication network, in response to detecting a missed call to the first device. In another embodiment, the forwarding may be performed by the first device itself.

Then at step 104, the second telecommunications network obtains missed call details for the forward missed call, once it has been received on the forwarding address. The missed call details comprise the Calling Party Address (hereinafter CgPA), and the address of the first device (the Called Party Address, hereinafter CdPA). In various embodiments, further details about the missed call are obtained. The details may include, as a non-limiting example, the time of the missed call, and an indication that a voice mail message has been recorded in connection with the missed call. A number of techniques that may be employed by the second telecommunications network to obtain the missed call details are known in the art. Some of these techniques are discussed in this application by way of non-limiting example. It would be apparent to one skilled in the art that a variety of techniques to obtain the missed call details may be employed by the second telecommunications network without deviating from the spirit and scope of the present invention. Thereafter, at step 106, the second telecommunications network identifies a second device associated with the first device. The identified second device may be one that is used by the user of the first device. Various techniques for the identification of the second device are discussed in this application by way of non-limiting example. Various other techniques may be employed without deviating from the spirit and scope of the present invention.

Finally, at step 108, the second telecommunications network delivers an alert to the identified second device, notifying the second device of the missed call to the first device. The alert contains the missed call details, or at least a part thereof. In various embodiments, the missed call alert may be delivered to more than one device. For example, an MCA Short Message Service (SMS) message may be delivered to a second device. Additionally, an email message may be delivered. Further, alerts may be delivered selectively to the second device, based on the missed call details. Such selection may be, for example, according to the user's preference. In an embodiment, the user's preferences for selective delivery of MCAs are obtained from the user through a web-interface, and stored in a database in the second telecommunications network.

Figure 2:
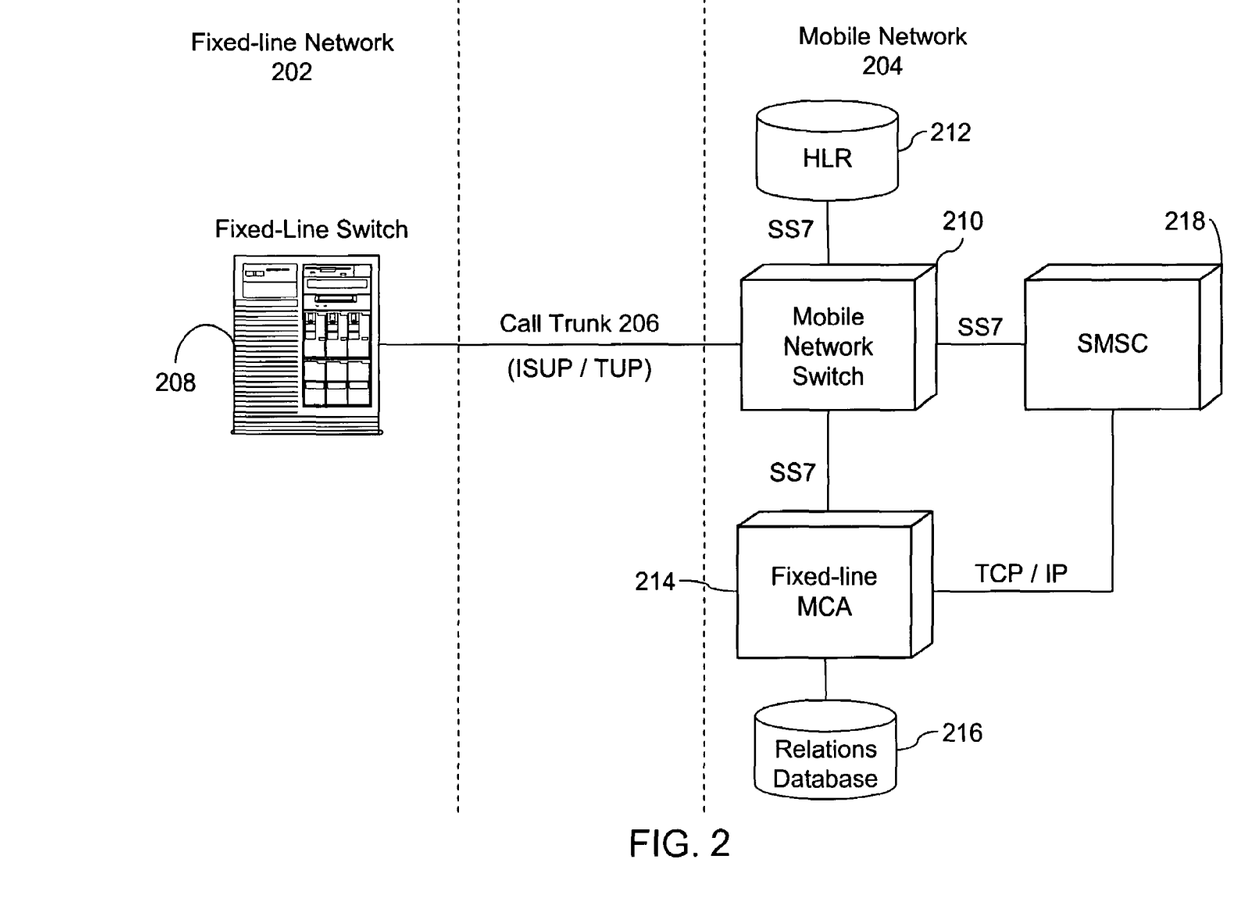
FIG. 2 is a block diagram depicting the environment of an embodiment of the present invention for delivery of missed call alerts for a user's fixed-line phone to the user's mobile phone.

More specifically, the present invention finds an application in providing missed call alerts for fixed-line phones. It is often the case that the user of a fixed-line phone also uses a mobile phone. Further, it is often desirable in such cases to deliver a missed call alert for the fixed-line phone to the mobile phone of the user. Various embodiments of the present invention provide for delivery of missed call alerts for a user's fixed-line phone to the user's mobile phone. FIG. 2 is a block diagram depicting the environment of one such embodiment of the present invention. The figure shows a fixed-line network 202, and a mobile network 204 connected through a call trunk 206. A fixed-line switch 208 performs call switching for fixed-line network 202. Similarly, a mobile network switch 210 performs call switching for mobile network 204. Fixed-line switch 208 and mobile network switch 210 are connected through call trunk 206, which supports Integrated Services Digital Network User Part (ISUP), Telephone User Part (TUP) communication. Mobile network switch 210 uses a Home Location Register (HLR) 212 to perform call switching. In an embodiment, mobile network switch 210 is a Gateway Mobile Switch Center (GMSC). Forwarded missed calls from the fixed-line phone (not shown in Figure) are routed through fixed-line switch 208 to mobile network switch 210. Fixed-line Switch 208 is configured to forward a call missed by the fixed-line phone to the forwarding address reserved by mobile network 204. Further, mobile network 204 comprises a fixed-line MCA logic 214 and a relations database 216 to implement the logic of obtaining missed call details and identifying the second device to which the MCA must be sent.

In an embodiment, the forwarding address may be a universal forwarding address, to which missed calls to all fixed-line phones (that have subscribed for fixed-line MCA) are routed. In this case, call trunk 206 guarantees delivery of the missed calls details, or at least a part thereof, using ISUP/TUP. Further, fixed-line MCA logic 214 maintains relations database 216 that lists pre-defined relations between the fixed-line phones and mobile phones. In an embodiment, relations database 216 is compiled and maintained using a web-interface. In another embodiment, relations database 216 is compiled and maintained using SMS-based commands from the user's mobile phones.

In another embodiment, the forwarding address may be a user-specific forwarding address wherein a unique forwarding address is assigned for a user. The forwarding address, for example, can be a specially prefixed number that consists of a prefix that routes the missed call towards mobile network 204 and the user's mobile phone. In this case, there is no need to retrieve missed call details using call trunk 206. Furthermore, there is no need of relations database 216 to relate the fixed-line phone with the mobile phone.

Finally, mobile network 204 comprises a Short Message Service Center (SMSC) 218 to deliver MCA SMS alerts to the mobile phone (not shown in Figure).

Figure 3:
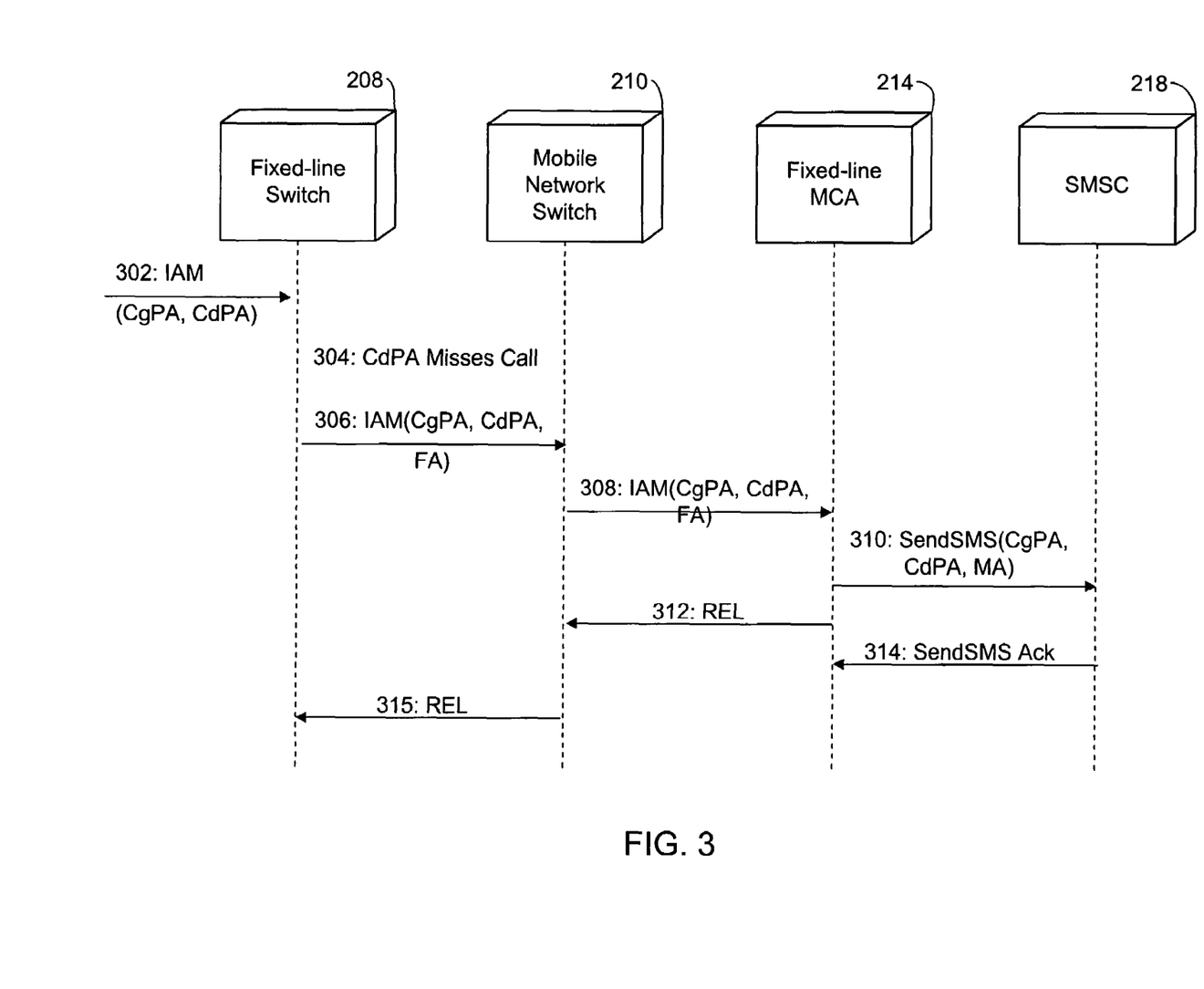
FIG. 3 shows a sample signal flow diagram in accordance with an embodiment of the present invention.

FIG. 3 shows a sample signal flow diagram in accordance with an embodiment of the present invention. At step 302, an ISUP Initial Addressing Message (IAM) is received at fixed-line switch 208 indicating that a calling party (denoted in the figure as CgPA) is attempting to call a fixed-line phone (denoted in the figure as CdPA, or the called party), which is the fixed-line phone. In response to the IAM, fixed-line switch 208 rings the fixed-line phone. At step 304, it is detected that the fixed-line phone is not answering, and has missed the call. At step 306, the call is forwarded to forwarding address (denoted in the figure as FA), which contains a routing prefix of mobile network 204. Hence, the call is routed to mobile network switch 210. Then at step 308, mobile network switch 210 routes the call based on the special prefix in the forwarding address to fixed-line MCA logic 214. In various embodiments, the signaling for routing this call to fixed-line MCA logic 214 can be ISUP, Intelligent Network (IN) signaling. Thereafter, fixed-line MCA logic 214 deduces the address of the associated mobile phone, or the mobile address (denoted in the figure as MA). The mobile address may be deduced from the missed call details, namely from the forwarding address. Alternatively, it may be deduced from the fixed-line phone address using relations database 216. In various embodiments, fixed-line MCA logic 214 also checks fixed-line MCA subscription to see if the identified mobile phone number has subscribed to the fixed-line MCA service.

Then at step 310, fixed-line MCA logic 214 issues a command to SMSC 218 to deliver a MCA SMS to the mobile phone. The command may be issued though an Internet Protocol (IP) link using, for example, Short Message Peer-to-peer Protocol (SMPP). Alternatively, the command may be issued via a Signaling System (SS7) link using, for example, Mobile Application Part (MAP). SMSC 218 then delivers the missed call alert as an SMS to the mobile phone. In various embodiments of the present invention, the alert may also be delivered to multiple mobile phones, email addresses, or both. The content of the alert indicates the calling party address, and the fixed-line phone address. The alert may optionally include additional information such as the time of the missed call and number of times that the same caller's calls were missed.

Then at step 312, fixed-line MCA logic 214 issues an ISUP Release (REL) command to mobile network switch 210, to release the call set up at step 308. At step 314, SMSC 218 acknowledges the delivery of the alert to the mobile phone. Finally, at step 316, mobile network switch 210 issues an ISUP REL command to fixed-line switch 208 to release the call set up at step 306. Therefore, the call is released without answering the call. The information from the call setup is used to obtain missed call information.

Figure 4:
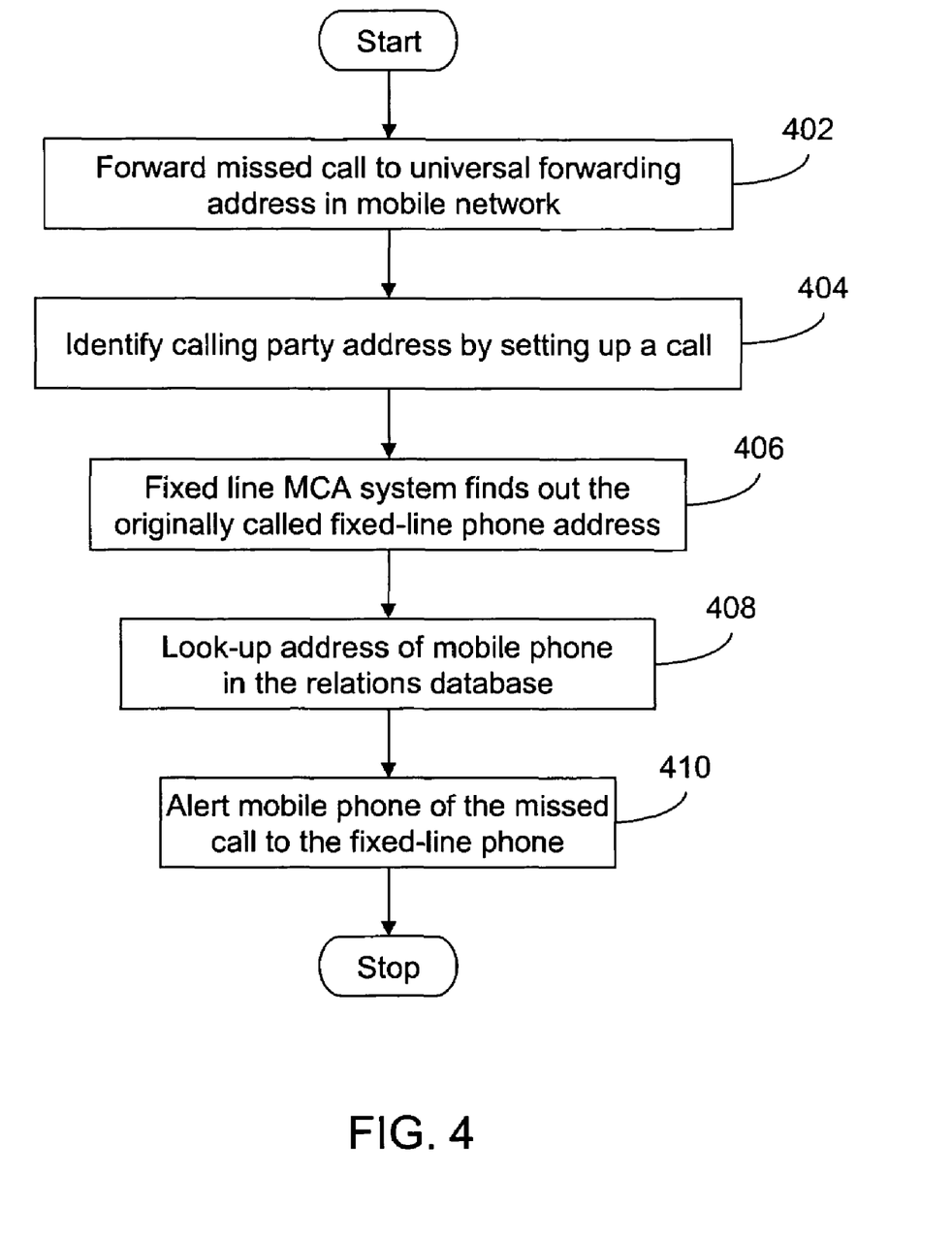
FIG. 4 is a flow-chart depicting a method of delivering missed call alerts to a mobile phone, for calls missed by a fixed-line phone, in accordance with an embodiment of the present invention.

FIG. 4 is a flow-chart depicting a method of delivering missed call alerts to a mobile phone for calls missed by a fixed-line phone, in accordance with an embodiment of the present invention. The embodiment described with reference to this figure uses an approach where the missed calls are forwarded to a universal forwarding address reserved by mobile network 204. At step 402, a missed call to a fixed-line phone is forwarded to a universal forwarding address in mobile network 204. In this case, the forwarding may be set up for the fixed-line MCA subscribers by the operator of fixed-line network 202. The operator sets every fixed-line MCA subscriber's call forwarding to the universal forwarding address. Then at step 404, the calling party address is identified by setting up the call (e.g. using ISUP IAM message) received by mobile network 204 to fixed line MCA system 214. In various embodiments, the call setup is done to obtain missed call details, including for example the calling party address. The call is subsequently released without answering the call. Then at step 406, fixed line MCA system 214 extracts from the missed call details for the called party address in the OCN (Originally Called Number) of the call set up message (e.g. ISUP IAM), that is, the address of the fixed-line phone which missed the call. Subsequently, at step 408, the address of the mobile phone associated with the called fixed-line phone is obtained from relations database 216. Finally, at step 410, a missed call alert is delivered to the mobile phone, notifying of the call missed by the fixed-line phone. This approach requires partnership between fixed-line network and mobile network operators. It allows subscriber to set up and cancel fixed-line MCA. It further allows the subscribers to add, modify, and delete their associations between fixed-line phone addresses and mobile phone addresses via mobile SMS and/or a web-interface.

Figure 5:
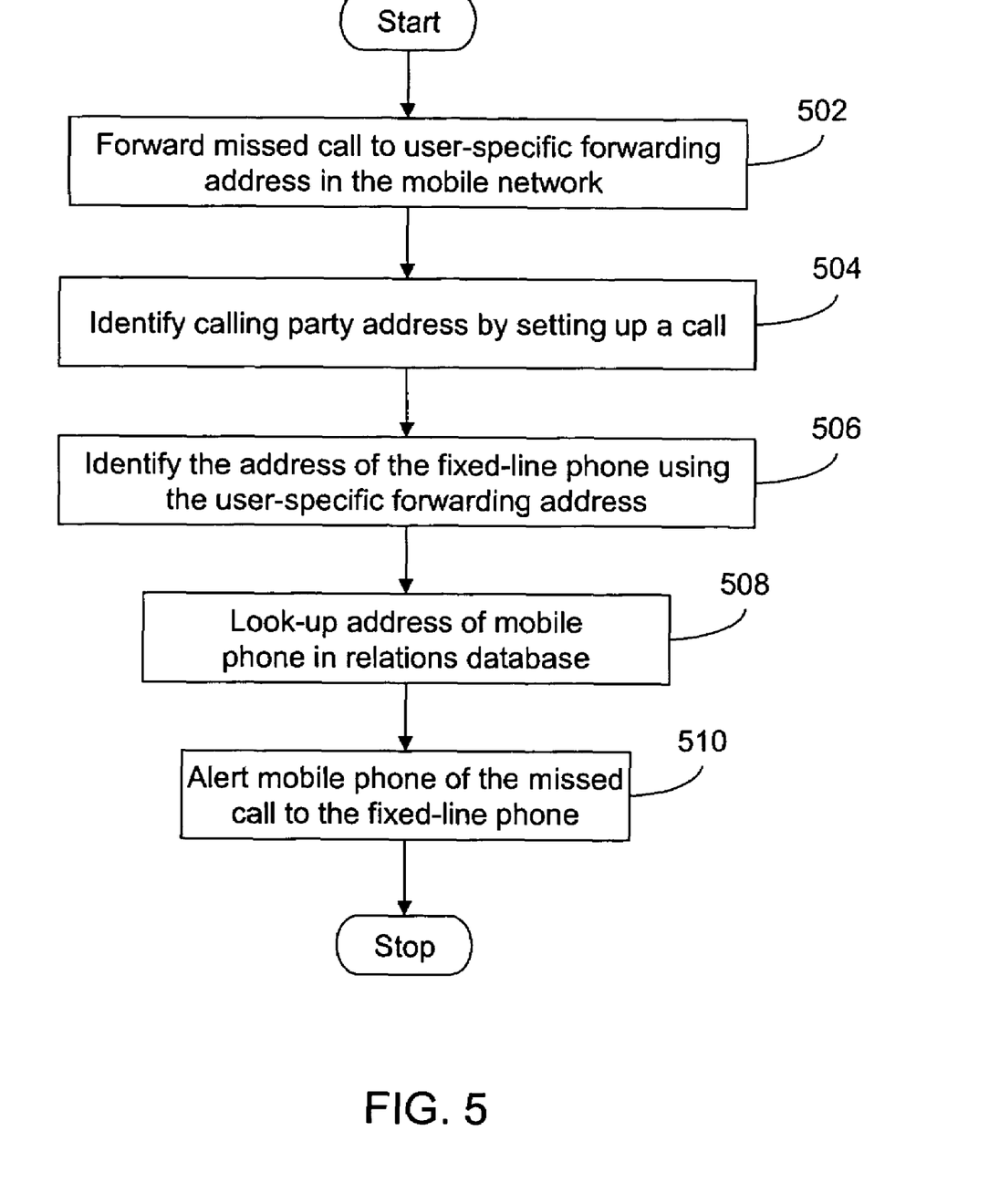
FIG. 5 is a flow-chart depicting a method of delivering missed call alerts to a mobile phone, for calls missed by a fixed-line phone, in accordance with another embodiment of the present invention.

FIG. 5 is a flow-chart depicting a method of delivering missed call alerts to a mobile phone for calls missed by a fixed-line phone, in accordance with another embodiment of the present invention. The embodiment described with reference to this figure uses an approach where the calls are forwarded to a user-specific forwarding address in mobile network 204. At step 502, a missed call to a fixed-line phone is forwarded to a user-specific forwarding address in mobile network 204. In this case, the forwarding may be set up by the fixed-line MCA subscribers themselves, independent of the operator of fixed-line network 202. The fixed-line phone user sets up the fixed-line phone to forward missed calls, conditionally or unconditionally, to the user-specific forwarding address in mobile network 204. Then at step 504, the calling party address is identified by setting up the call received by mobile network 204. In various embodiments, the call setup is done to obtain missed call details, including for example the calling party address and the called fixed line phone address. The call is subsequently released without answering the call. Then at step 506, mobile network 204 identifies the called party address, that is, the address of the fixed-line phone that missed the call, using the user-specific forwarding address on which the forwarded missed call is received. There is a one-to-one mapping between the fixed-line phone address and the user-specific forwarding number, since a unique forwarding number is assigned to each user. Mobile network 204 may maintain a database of the associations between the fixed-line phone addresses, and the user-specific forwarding addresses they have been assigned. In an alternate embodiment, the user-specific forwarding address is assigned in a manner so as to contain the associated fixed-line phone address, or at least a uniquely identifiable part thereof. In this embodiment, there is no need to maintain the database of associations between the fixed-line phone addresses, and the user-specific forwarding addresses they have been assigned.

Subsequently, at step 508, the address of the mobile phone associated with the called user-specific forwarding address is obtained from relations database 216. Finally, at step 510, a missed call alert is delivered to the mobile phone, notifying of the call missed by the fixed-line phone. This approach may be implemented by the operator of mobile network 204 independent of the operator of fixed-line network. The user of the fixed-line phone only needs to subscribe to the call forwarding feature of fixed-line network 202 or just do a forwarding anytime on a need basis (hereinafter one-time need basis approach). The one-time need basis approach has the advantage that the user does not have to pay for the forwarded call since the forwarded call is never answered.

It would be apparent to one skilled in the art that the criteria used for identifying a call as a missed call is not a limitation on the application of the present invention. A call can be identified as a missed call, without limitation, in a "no answer" condition, a busy condition, or even unconditionally.

OTHER VARIATIONS

Provided above for the edification of those of ordinary skill in the art, and not as a limitation on the scope of the invention are detailed illustrations of a scheme for providing a Missed Call Alert (MCA) for a missed call to a first device in a first telecommunications network, wherein the MCA is provided to a second device in a second telecommunications network. Numerous variations and modifications within the spirit of the present invention will of course occur to those of ordinary skill in the art in view of the embodiments that have now been disclosed. For example, while in the described embodiments, the present invention is implemented primarily from the point of view of fixed-line missed call alerts, the present invention may also be effectively implemented for missed call alerts for mobile phone wherein the user wishes to be alerted of a call missed by another mobile phone or email client, or any other setup wherein missed call alerts are desired at devices (e.g. email clients) other than the device that missed the call.

The examples under the present invention, detailed in the illustrative examples contained here, are described using terms and constructs drawn largely from GSM mobile telephony infrastructure. But use of these examples should not be interpreted to limiting the invention to those media. The methods and principles disclosed by the present invention can be of use and provided through any type of telecommunications medium, including without limitation: (i) any mobile telephony network including without limitation GSM, 3GSM, 3G, CDMA, WCDMA or GPRS, satellite phones or other mobile telephone networks or systems; (ii) any so-called WiFi apparatus that is capable of receiving alert messages from a telecommunications network, including apparatus not dedicated to telecommunications such as personal computers, Palm-type or Windows Mobile devices; (iii) fixed-line devices capable of receiving alert messages such as the eye2eye devices from Dlink; or telecommunications equipment meant for voice over IP communications such as those provided by Vonage or Packet8.

In describing certain embodiments of the present invention, this specification follows the path of a telecommunications call from a calling party to a subscriber or called party. For the avoidance of doubt, that call can be for a normal voice call, in which the subscriber telecommunications equipment is also capable of visual, audiovisual or motion-picture display. Alternatively, those devices or calls can be for text, video, pictures or other communicated data.

TERMINOLOGY SECTION

CLI: Calling Line Identification
ISUP: ISDN Service User Part
TUP: Telephony User Part
HLR: Home Location Register
VLR: Visit Location Register
VMSC: Visit Mobile Switch Center
GMSC: HPMN Gateway MSC
MSC: Mobile Switch Center
MCA: Missed Call Alert
IAM: Initial Address Message
IDP: Initial DP IN message
IN: Intelligent Network protocol
ISUP: ISDN User Part
SS7: Signaling System 7
SPC: Signal Point Code
DPC: Destination Point Code
SCCP: Signal Connection Control part
SMSC: Short Message Center
STP: Signal Transfer Point
SRI: Send Routing Information
SRI-SM: Send Routing Information for Short Message
HPMN: Home Public Mobile Network
VPMN: Visited Public Mobile Network
MSISDN: Mobile Subscriber ISDN
MSRN: Mobile Station Roaming Number
IMSI: International Mobile Subscriber Identifier
SCP: Signal Control Point
BCD: Binary Coded Decimal
MAP: Mobility Application Protocol
OCN: Original Called Number
ME: Mobile Equipment

TECHNICAL REFERENCES

GSM 902 on MAP specification
Digital cellular telecommunications system (Phase 2+);
Mobile Application Part (MAP) Specification
(3GPP TS 09.02 version 7.9.0 Release 1998)
Q761-Q730 on ISUP Signaling, Function and Procedure
Q.761 (Functional description of the ISDN User Part of CCITT Signaling System No. 7)
Q.762 (General functions of CCITT Signaling System No. 7 ISDN User Part Messages and parameters)
Q.763 (Formats and codes of CCITT Signaling System No. 7 ISDN User Part Messages and parameters)
Q.764 (1999), Signaling System No. 7—ISDN User Part signaling procedures
Q.763 (1999), Signaling System No. 7—ISDN User Part formats and codes
Q.730 (1999), ISDN User Part supplementary services
Q.711 (1996), Functional description of signaling connection control part
Q.712 (1996), Definition and function of signaling connection control part messages
Q.713 (1996), Signaling connection control part formats and codes
Q.714 (1996), Signaling connection control part procedures
Q.716 (1993), Signaling Connection Control Part (SCCP) performance
GSM 340 on SMS
Digital cellular telecommunications system (Phase 2+);
Technical realization of the Short Message Service (SMS);
(GSM 03.40 version 7.4.0 Release 1998)

What is claimed is:

1. A method of providing a Missed Call Alert (MCA) for a missed call to a first device in a first telecommunications network, wherein the MCA is provided to a second device in a second telecommunications network, the method comprising:
    forwarding a call missed by the first device to a forwarding address in the second telecommunications network;
    obtaining missed call details from the forwarded call at the second telecommunications network, wherein the missed call details comprise a calling party address and the address of the first device;
    identifying the address of the second device, wherein the second device is associated with the first device; and
    alerting the second device of the missed call to the first device, wherein forwarding the call comprises forwarding the call to a universal forwarding address reserved by the second telecommunications network for receiving forwarded missed calls from any device in the first telecommunications network.

2. The method of claim 1, wherein obtaining missed call details comprises issuing a query for the missed call details, or a part thereof, from the second telecommunications network to the first telecommunications network.

3. The method of claim 2, wherein the query is selected from a group consisting of Integrated Services Digital Network User Part (ISUP), Telephone User Part (TUP), and combinations thereof.

4. The method of claim 1, wherein forwarding the call comprises forwarding the call to a user-specific forwarding address reserved by the second telecommunications network for receiving forwarded missed calls from the first device.

5. The method of claim 4, wherein obtaining missed call details comprises identifying the address of the first device using the user-specific forwarding address.

6. The method of claim 4, wherein identifying the address of the second device comprises obtaining the address of the second device from the user-specific forwarding address.

7. The method of claim 1, wherein the method further comprises maintaining a relations database at the second telecommunications network, wherein the relations database stores relationships between devices of the first telecommunications network and devices of the second telecommunications network.

8. The method of claim 7, wherein identifying the address of the second device comprises looking up the address of the second device from the relations database using the address of the first device.

9. The method of claim 1, wherein forwarding the call comprises sending an Initial Address Message (IAM) from the first telecommunications network to the second telecommunications network, wherein the IAM includes the calling party address and the address of the first device.

10. The method of claim 9, wherein obtaining missed call details comprises extracting the address of the first device from the IAM.

11. The method of claim 1, wherein alerting the second device comprises sending an alert selected from the group consisting of a Short Message Service (SMS) message, an email message, and combinations thereof.

12. The method of claim 1, wherein the first telecommunications network is one selected from a group consisting of a fixed line network and a mobile network.

13. The method of claim 12, wherein the first telecommunications network is different from the second telecommunications network.

14. A method of providing a Missed Call Alert (MCA) for a missed call to a fixed-line phone, wherein the MCA is provided to a mobile phone, the method comprising:
   forwarding a call missed by the fixed-line phone to a forwarding address in the mobile network;
   obtaining missed call details from the forwarded call at the mobile network, wherein the missed call details comprise a calling party address and the address of the fixed-line phone;
   identifying the address of the mobile phone, wherein the mobile phone is related to the fixed-line phone; and
   alerting the mobile phone of the missed call to the fixed-line phone, wherein forwarding the call comprises forwarding the call to a universal forwarding address reserved by the mobile network for receiving forwarded missed calls from any device in the fixed-line network.

15. The method of claim 14, wherein obtaining missed call details comprises issuing a query for the missed call details, or a part thereof, from the mobile network to the fixed-line network.

16. The method of claim 15, wherein the query is selected from a group consisting of Integrated Services Digital Network User Part (ISUP), Telephone User Part (TUP), and combinations thereof.

17. The method of claim 14, wherein forwarding the call comprises forwarding the call to a user-specific forwarding address reserved by the mobile network for receiving forwarded missed calls from the fixed-line phone.

18. The method of claim 17, wherein obtaining missed call details comprises identifying the address of the fixed-line phone using the user-specific forwarding address.

19. The method of claim 17, wherein identifying the address of the mobile phone comprises obtaining the address of the mobile phone from the user-specific forwarding address.

20. The method of claim 14, wherein the method further comprises maintaining a relations database at the mobile network, wherein the relations database stores relationships between devices of the fixed-line network and devices of the mobile network.

21. The method of claim 20, wherein identifying the address of the mobile phone comprises looking up the address of the mobile phone from the relations database using the address of the fixed-line phone.

22. The method of claim 14, wherein forwarding the call comprises sending an Initial Address Message (IAM) from the fixed-line network to the mobile network, wherein the IAM includes the calling party address and the address of the fixed-line phone.

23. The method of claim 22, wherein obtaining missed call details comprises extracting the address of the fixed-line phone from the IAM.

24. The method of claim 14, wherein alerting the mobile phone comprises sending an alert selected from the group consisting of a Short Message Service (SMS) message, an email message, and combinations thereof.

25. The method of claim 14, wherein the fixed-line phone is one selected from a group consisting of a phone from a fixed line network and a phone from a mobile network.

26. The method of claim 25, wherein the fixed-line phone is different from the mobile phone.

27. A method of providing a Missed Call Alert (MCA) for a missed call to a fixed-line phone, wherein the MCA is provided to an email address, the method comprising:
   forwarding a call missed by the fixed-line phone to a forwarding address in the mobile network;
   obtaining missed call details from the forwarded call at the mobile network, wherein the missed call details comprise a calling party address and the address of the fixed-line phone;
   identifying the email address related to the fixed-line phone; and
   sending an alert to the email address of the missed call to the fixed-line phone, wherein forwarding the call comprises forwarding the call to a universal forwarding address reserved by the mobile network for receiving forwarded missed calls from any device in the fixed-line network.

28. The method of claim 27, wherein identifying the email address comprises obtaining the email address from the user-specific forwarding address.

* * * * *